United States Patent
Shimizu et al.

(10) Patent No.: US 12,109,967 B2
(45) Date of Patent: Oct. 8, 2024

(54) AIRBAG DEVICE

(71) Applicant: Autoliv Development AB, Vargarda (SE)

(72) Inventors: Takayuki Shimizu, Kanagawa (JP); Atsushi Nakashima, Kanagawa (JP); Yutaka Nakajima, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 56 days.

(21) Appl. No.: 17/759,018

(22) PCT Filed: Jan. 14, 2021

(86) PCT No.: PCT/JP2021/000991
§ 371 (c)(1),
(2) Date: Jul. 18, 2022

(87) PCT Pub. No.: WO2021/149576
PCT Pub. Date: Jul. 29, 2021

(65) Prior Publication Data
US 2023/0034054 A1     Feb. 2, 2023

(30) Foreign Application Priority Data
Jan. 23, 2020   (JP) .................................. 2020-009560

(51) Int. Cl.
*B60R 21/231*      (2011.01)
*B60R 21/207*      (2006.01)
*B60R 21/2338*     (2011.01)

(52) U.S. Cl.
CPC ...... *B60R 21/23138* (2013.01); *B60R 21/207* (2013.01); *B60R 21/2338* (2013.01);
(Continued)

(58) Field of Classification Search
CPC .......... B60R 21/23138; B60R 21/207; B60R 21/2338; B60R 2021/23146; B60R 2021/23386
See application file for complete search history.

(56) References Cited

U.S. PATENT DOCUMENTS 5,803,485 A * 9/1998 Acker ............... B60R 21/23138
280/730.2
6,010,150 A * 1/2000 Amann ............. B60R 21/23138
280/730.2
(Continued)

FOREIGN PATENT DOCUMENTS

| CN | 109421650 A | 3/2019 |
|----|-------------|--------|
| JP | 11-510765 A | 9/1999 |

(Continued)

OTHER PUBLICATIONS

Office Action received in corresponding Chinese Patent Application 202180007677.6, dated Mar. 31, 2023 with translation.

*Primary Examiner* — Jason D Shanske
*Assistant Examiner* — Joselynn Y Sliteris
(74) *Attorney, Agent, or Firm* — Harness, Dickey & Pierce, P.L.C.; Stephen T. Olson

(57) ABSTRACT

An airbag device installed in a vehicle seat having a seat cushion forming a seat surface and a seatback forming a backrest, being provided with an inflator stowed in one side portion of the seatback that generates inflation gas, and an airbag stowed in the seatback in a rolled or folded state that deploys from one side portion by the inflator releasing the inflation gas. The airbag deploys toward the front of the seatback and includes an upper chamber region for protecting at least around the head and neck of the occupant and a lower chamber region for protecting mainly from the waist to the shoulders of the occupant.

13 Claims, 12 Drawing Sheets

(52) U.S. Cl.
CPC ............... *B60R 2021/23146* (2013.01); *B60R 2021/23386* (2013.01)

(56) References Cited

U.S. PATENT DOCUMENTS

| | | | | |
|---|---|---|---|---|
| 7,735,858 | B2* | 6/2010 | Megiveron | B60R 21/0136 |
| | | | | 280/730.2 |
| 8,840,135 | B2* | 9/2014 | Jenny | B60R 21/20 |
| | | | | 280/730.2 |
| 11,230,250 | B2* | 1/2022 | Sturm | B60R 21/2338 |
| 11,338,757 | B2* | 5/2022 | Hagg | B60R 21/207 |
| 11,351,950 | B2* | 6/2022 | Sandinge | B60R 21/2338 |
| 11,691,588 | B2* | 7/2023 | Fukawatase | B60R 21/18 |
| | | | | 280/728.2 |
| 11,766,985 | B2* | 9/2023 | Shimizu | B60R 21/23138 |
| | | | | 280/730.2 |
| 2015/0115583 | A1 | 4/2015 | Azuma et al. | |
| 2019/0054890 | A1* | 2/2019 | Kwon | B60R 21/2338 |

FOREIGN PATENT DOCUMENTS

| | | | |
|---|---|---|---|
| JP | 2000-085515 A | 3/2000 | |
| JP | 2006-281967 A | 10/2006 | |
| JP | 2009-029182 A | 2/2009 | |
| JP | 2013-233863 A | 11/2013 | |
| JP | 2019-001213 A | 1/2019 | |
| JP | 2019-034710 A | 3/2019 | |
| WO | 2011/077510 A1 | 6/2011 | |
| WO | 2011/132316 A1 | 10/2011 | |
| WO | 2013/108473 A1 | 7/2013 | |
| WO | 2013/157082 A1 | 10/2013 | |
| WO | 2018/211894 A1 | 11/2018 | |
| WO | WO-2019170596 A1 * | 9/2019 | ........... B60R 21/207 |
| WO | WO-2019238871 A1 * | 12/2019 | ........... B60R 21/207 |

* cited by examiner

Embodiment 1

Embodiment 2

Stowing aspect 1 (rear surface)

FIG. 8B

Stowing aspect 2 (rear surface)

Stowing aspect 4 (rear surface)

FIG. 10B

Stowing aspect 4 (side surface)

FIG. 11A

Stowing aspect 5 (side surface)

FIG. 11B

Stowing aspect 6 (rear surface)

FIG. 12

AIRBAG DEVICE

TECHNICAL FIELD

The present invention relates to an airbag device installed and mounted on a vehicle seat.

BACKGROUND ART

The provision of a vehicle with one or more airbags in order to protect the occupants thereof in the event of a vehicle accident is well known. These airbags include, for example, various forms such as: a so-called driver airbag which is deployed from near the center of the steering wheel so as to protect the driver; a curtain airbag which is deployed downward on the inner side of the window of an automobile so as to protect occupants during collisions in the transverse direction of a vehicle, as well as when overturning and during rollover accidents; and a side airbag which is deployed between the occupant and the side panel so as to protect the occupant upon impact in the transverse direction of a vehicle.

With the advancement of self-driving vehicle technologies in recent years, the degree of freedom in the arrangement of seats has also increased and it is anticipated that occupants will seat themselves in various postures such as with the seat fully reclined. In such a situation, it is difficult to sufficiently protect the occupants using a conventional curtain airbag or side airbag. For example, in a situation such as the seat being greatly separated from the door of the vehicle, the curtain airbag may be overly far from the occupant and may be unable to exhibit restraining performance. However, side airbags are structured to deploy from a left or right side of the seat or from both sides, making it difficult to adequately protect occupants in various postures. In particular, means are needed for properly protecting the head of the occupant.

SUMMARY OF THE INVENTION

Problem to be Solved by the Invention

The present invention has been created in view of the aforementioned problems, and an object thereof is to provide an airbag device capable of reliably restraining and protecting occupants regardless of a seating arrangement in the cabin or a seated posture of the occupant.

Means to Solve the Problem

In order to achieve the above purpose, the present invention, being an airbag device installed on a vehicle seat having a seat cushion forming a seat surface and a seatback forming a backrest, is provided with an inflator stowed on one side portion of the seatback that generates inflation gas, and an airbag stowed in the seatback in a rolled or folded state that deploys from the one side portion by the inflator releasing the inflation gas. The airbag deploys toward the front of the seatback and includes an upper chamber region for protecting at least around the head and neck of the occupant and a lower chamber region for protecting mainly from the waist to the shoulders of the occupant.

Here, although the airbag is in a "rolled or folded state", the method of compressing the airbag is not limited thereto. Various forms may be employed in addition to simply rolling the airbag such as, for example, folding once then rolling.

In the present invention such as described above, since the airbag includes an upper chamber region for protecting near the head and neck of the occupant and a lower chamber region for protecting from the waist to the shoulders of the occupant, the airbag not only protects from the waist to the shoulders of the occupant, as with existing side airbags nor protects only around the head of the occupant, as with curtain airbags, but is capable of protecting these both to a broad extent. That is, the air bag deploys in a semi-dome shape, covering an entire side portion of the occupant seated in the seat, which combines the functions of side airbags and curtain airbags.

Furthermore, since the airbag is disposed on the one side portion of the seatback, the airbag device according to the present invention can be mounted even without a special seat frame structure. That is, the airbag according to the present invention can be easily mounted to an existing vehicle seat without a significant design change or the like to the seat frame.

Note that in the present invention, the occupant represents the side impact dummy world SID (an adult male (175 cm in height and approximately 74 kg in weight) 50th percentile male side impact dummy: side collision test dummy).

In the airbag device according to the present invention such as described above, the airbag includes: an inflator insertion port provided on a vehicle rear side in a central portion in the vertical direction; a duct part for communicating with the inflator insertion port that extends in the vertical direction along an edge portion on the vehicle rear side, from the upper chamber region across the lower chamber region; a head/neck protecting chamber included in the upper chamber region that extends from an upper portion including an upper end portion of the duct part in the vehicle front direction; a shoulder protecting chamber included in the lower chamber region, separated from the duct part and the head/neck protecting chamber by a compartment, positioned in the vehicle front side of the inflator insertion port, and connected to the head/neck protecting chamber on the vehicle front side; a waist protecting chamber that extends from a lower portion including a lower end portion of the duct part vehicle front direction and is separated from the waist protecting chamber by a partition wall; and a shoulder front protecting chamber included in the lower chamber region, positioned in the shoulder protecting chamber on the vehicle front side, separated from the head/neck protecting chamber and the shoulder protecting chamber by the compartment, and connected to the shoulder protecting chamber and the waist protecting chamber.

Moreover, the airbag device preferably has a non-expandable seatbelt holder (recessed part) between the shoulder front protecting chamber and the waist protecting chamber.

It is preferable that one portion of the airbag be configured so as to be positioned between the seatbelt and the occupant when deployed. For example, a periphery of a boundary between the upper chamber region and the lower chamber region of the airbag may be configured so as to be positioned between the seatbelt and the occupant.

When positioned between the seatbelt and the occupant as described above, the airbag deploys while in contact with the seatbelt at a time inflation is initiated, and the airbag captures a reaction force from the seatbelt. As a result, the deployment behavior and deployment orientation of the entire airbag are stabilized. In particular, the upper chamber region rises readily in the vertical direction (perpendicular direction) and does not fall significantly in the width direction of the seat and can thereby reliably restrain around the head of the occupant.

The upper chamber region of the airbag may be configured so as to be disposed more on the side of one side portion than the center in the width direction of the seatback (hereinafter called "seatback center").

Note that "disposed more on the side of one side portion than the seatback center" means that the airbag fits on half of one side of the seatback (one side portion side) and does not substantially reach the other half, and does not strictly mean that a tip end part of the upper chamber region does not protrude over the seatback center even one mm.

By disposing the upper chamber region against one side of the seatback in this manner, the airbag device can be mounted without interfering with the headrest even when the seatback has an adjustable headrest.

The upper chamber region of the airbag can be stowed in an upper portion of the seatback in a folded state.

By folding and stowing the upper chamber region in this manner, it is possible to dispose the upper chamber region in a limited space within the seatback with an appropriate and high degree of freedom.

A tether having a first securing part joined to the upper chamber region of the airbag and a second securing part joined to the seatback can be further provided.

By providing the tether as described above, prescribed tension is added to the upper chamber region of the airbag, which allows an orientation of the upper chamber region to be deployed in an appropriate state.

It is preferable that the second securing part be disposed more on the side of the one side portion than the seatback center.

By also disposing the tether in addition to the upper chamber region against one side of the seatback in this manner, mounting of the airbag device on the one side of the seatback is completed without interfering with the headrest even when the seatback has an adjustable headrest.

The second securing part of the tether can be joined near a rear surface, near an upper surface, or near a front surface of the seatback.

The vehicle seat is provided with a headrest disposed on the upper portion of the seatback and the headrest is joined to a headrest pole that extends perpendicular to the seatback, and one portion of the tether can be configured to extend in a state hooked on the headrest pole in a U-shape.

By wrapping (hooking) the tether onto the headrest pole as described above, a number of support points supporting the tether increases by one in addition to the first and second securing parts, making for reliable behavioral control of the airbag by means of the tether.

A tab may be provided for securing the airbag to an upper portion of the one side portion of the seatback.

The deployment behavior and orientation of the airbag are further stabilized by providing the tab as described above.

In the present invention, when an occupant is seated in a seat in a regular posture, the direction the occupant faces is referred to as the "front," the opposite direction is referred to as the "rear," and the direction indicating the coordinate axis is referred to as the "front-to-back direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

BRIEF DESCRIPTION OF THE DRAWINGS

FIG. 1 includes a side view (A) and a front view (B) illustrating an airbag device according to embodiment 1 of the present invention in a mounted state in a vehicle seat, where the vehicle seat is illustrated as see-through.

FIG. 2 illustrates the structure of the airbag according to embodiment 1 of the present invention.

FIG. 4 illustrates an activated state of the airbag device (deployed state of the airbag) according to embodiment 1 of the present invention.

FIG. 5 illustrates the structure of the airbag according to embodiment 2 of the present invention.

FIG. 7 illustrates an activated state (airbag deployed state) of the airbag device according to embodiment 2 of the present invention.

DESCRIPTION OF THE PREFERRED EMBODIMENTS

Embodiment 1

Figure 1A:
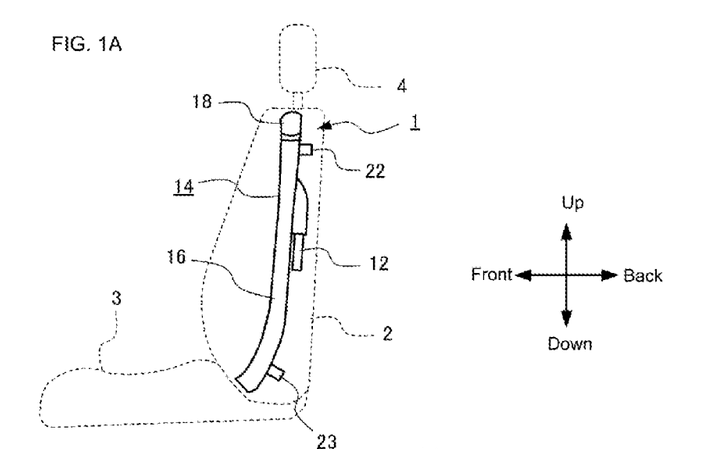
Figure 1B:
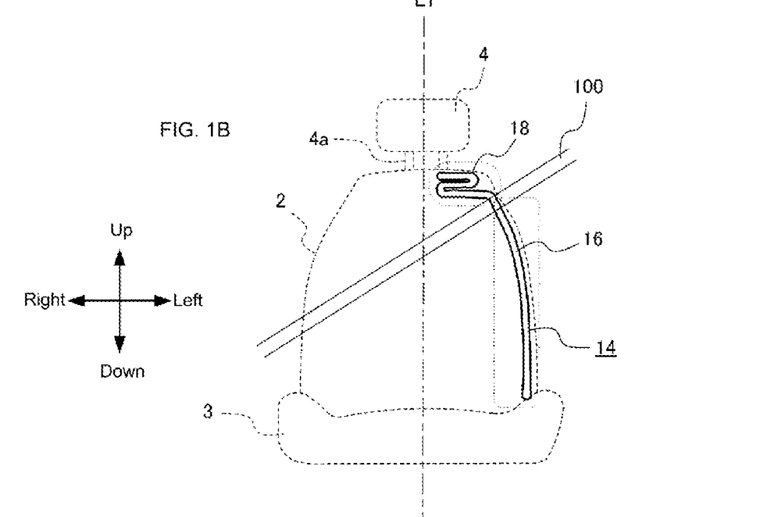
Figure 2A:
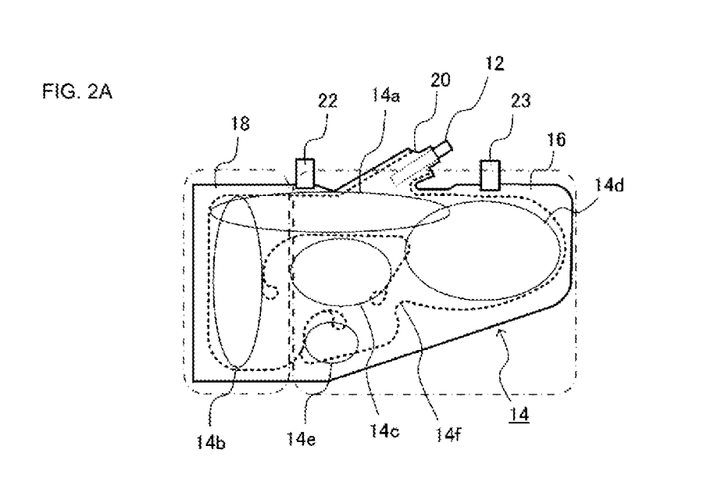
FIG. 2(A) is a plan view illustrating the state in which the airbag is deployed (state prior to compression, laid flat).
Figure 2B:
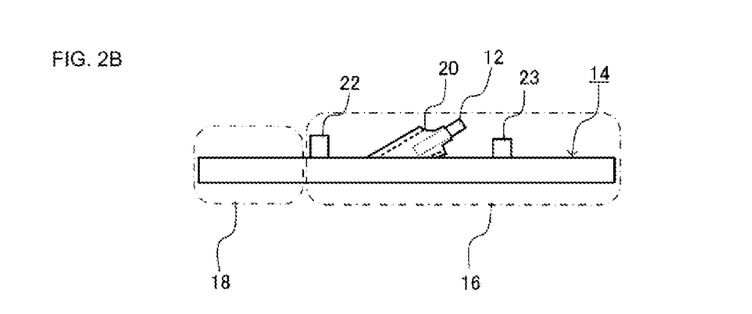
FIG. 2(B) is a front view illustrating the state in which the airbag is rolled (state when stowed).
Figure 3:
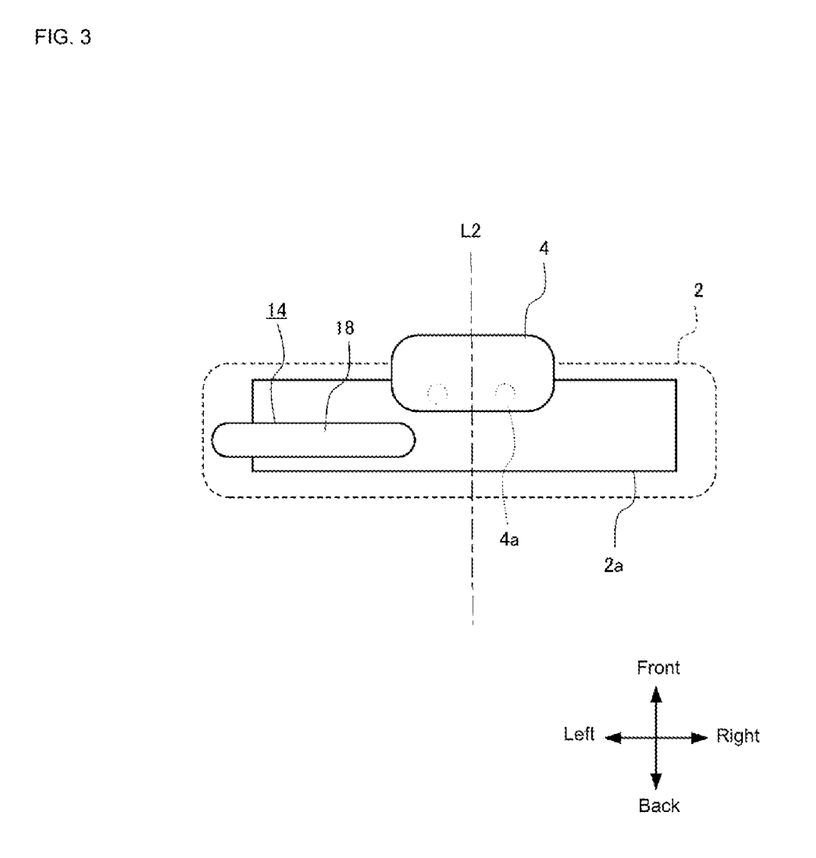
FIG. 3 is a top view illustrating an installed state of the airbag device according to embodiment 1 of the present invention.

FIG. 1 is a side view (A) and front view (B) illustrating a state in which an airbag device 1 according to embodiment 1 of the present invention is mounted in a vehicle seat (2, 3), where the vehicle seat (2, 3) is illustrated as see-through. FIG. 2 illustrates a structure of an airbag 14 adopted in an airbag device 1 according to embodiment 1 of the present invention. FIG. 2(A) is a plan view illustrating the state in which the airbag 14 is deployed (state prior to compression, laid flat). FIG. 2(B) is a front view illustrating the state in which the airbag is rolled (state when stowed). FIG. 3 is a top view illustrating an installed state of the airbag device according to embodiment 1.

The airbag device 1 according to the present invention is installed in a vehicle seat having a seat cushion 3 forming a seat surface, a seatback 2 forming a backrest, and a headrest 4 provided on an upper end portion of the seatback 2. The airbag device 1 is provided with an inflator 12 stowed on a side portion of a near side (door side) of the seatback 2 that generates inflation gas, and an airbag 14 stowed in the seatback 2 in a rolled or folded state that is deployed by the inflation gas released from the inflator 12.

The airbag device 1 according to the present embodiment is provided with connecting members 22 and 23 for securing the airbag 14, which is compressed in a rolled state, to the seatback 2. One end of a connecting member 22 is joined to an upper chamber region 18 of the airbag 14 and the other end is joined to an upper portion of the seat frame (not illustrated) above the inflator 12. Meanwhile, one end of the connecting member 23 is joined to a lower chamber region 16 of the airbag 14 and the other end is joined to a lower portion of the seat frame below the inflator 12. Note that the inflator 12 is introduced by an inflator introduction part 20 of the airbag 14. The inflator introduction part 20 is formed in the airbag 14 on the vehicle rear side in a center portion in the vertical direction of the airbag 14.

The airbag 14 is deployed toward the front of the seatback 2 and includes the upper chamber region 18 for protecting at least around the head and neck of the occupant and the lower chamber region 16 for protecting mainly from the waist to the shoulders of the occupant. Note that in FIG. 2, the upper chamber region 18 and the lower chamber region 16 are illustrated surrounded by alternate long and short dash lines showing the ranges thereof.

As described above, further dividing the distinction of the upper chamber region 18 and the lower chamber region 16 allows demarcation of the airbag 14 to include a duct part 14a, a head/neck protecting chamber 14b, a shoulder protecting chamber 14c, a waist protecting chamber 14d, and a shoulder front protecting chamber 14e.

The duct part 14a is configured to communicate with the inflator insertion port 20 and extend in the vertical direction from the upper chamber region 18 to the lower chamber region 16 along the edge portion on the rear vehicle side.

The head/neck protecting chamber 14b is included in the upper chamber region 18 and is formed extending from the upper portion including the upper end portion of the duct part 14a in the vehicle front direction.

The shoulder protecting chamber 14c is included in the lower chamber region 16 and is formed separated from the duct part 14a and the head/neck protecting chamber 14b by a compartment, positioned on the inflator insertion port 20 in the vehicle front direction, and connected to the head/neck protecting chamber 14b in the vehicle front direction.

The waist protecting chamber 14d is included in the lower chamber region 16 and extends from the lower portion including the lower end portion of the duct part 14a in the vehicle front direction and is formed separated from the shoulder protecting chamber 14c by a partition wall.

The shoulder front protecting chamber 14e is included in the lower chamber region 16, positioned in the shoulder protecting chamber 14c on the vehicle front side, separated from the head/neck protecting chamber 14b and the shoulder protecting chamber 14c by the compartment, and formed so as to be connected to the shoulder protecting chamber 14c and the waist protecting chamber 14d.

Moreover, a non-expandable seatbelt holder 14f (recessed part) is formed between the shoulder front protecting chamber 14e and the waist protecting chamber 14d.

As shown in FIG. 3, the upper chamber region 18 of the airbag 14 is disposed on the upper portion of a seat frame 2a in the seatback 2 in a folded state. For example, as illustrated in FIG. 1, the upper chamber region 18 can be folded into a Z shape (bellows shape). By folding and stowing the upper chamber region 18 in this manner, it is possible to dispose the upper chamber region 18 in a limited space within the seatback 2 with an appropriate and high degree of freedom.

Figure 4A:
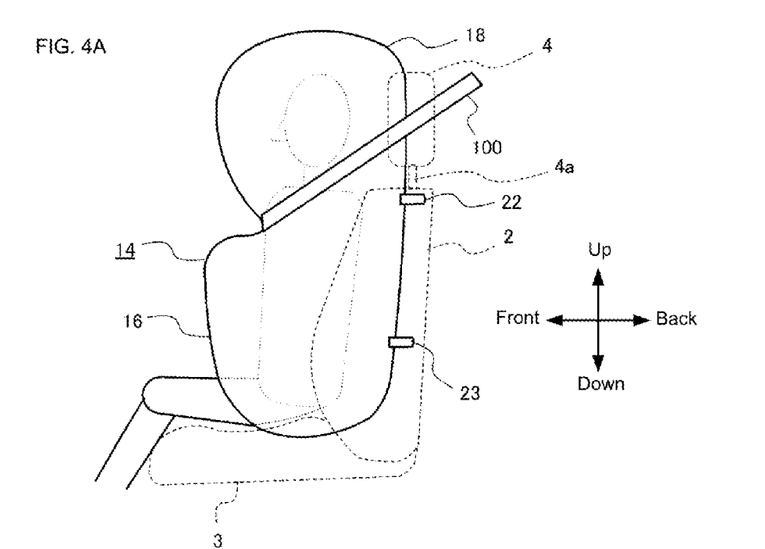
FIG. 4(A) illustrates a state viewed from the side in the vehicle width direction.
Figure 4B:
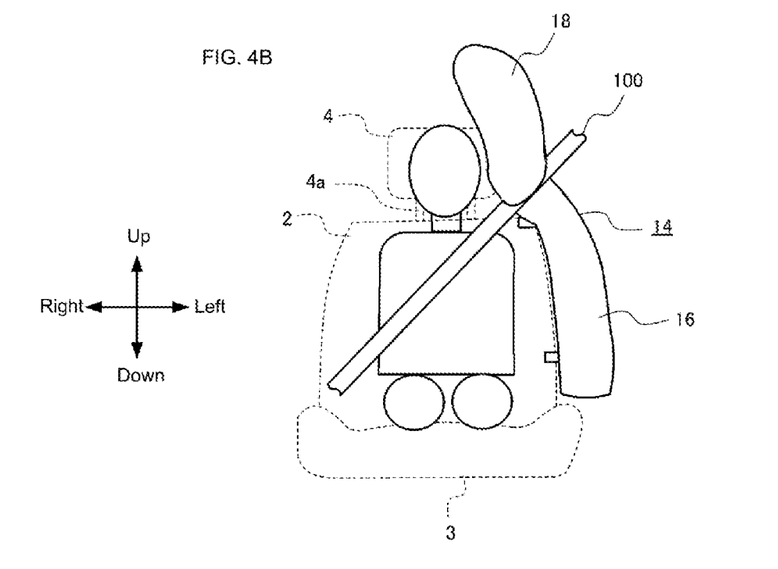
FIG. 4(B) illustrates a state viewed from the front.

FIG. 4 illustrates the activated state (deployed state of the airbag 14) of the airbag device 1 according to embodiment 1. FIG. 4(A) illustrates a state viewed from the side in the vehicle width direction, and FIG. 3(B) illustrates a state viewed from the front.

When a side collision or other event occurs, the inflation gas is released by the inflator 12, causing the airbag 14 to inflate/deploy. When the airbag 14 begins to inflate, the gas first flows into a side chamber 16 (the lower chamber region), and then into an upper chamber 18. Then, the side chamber 16 deploys from the side portion of the seatback 2 toward the front. The upper chamber 18 positioned near the head of the occupant then deploys forward.

As such, since the airbag 14 includes the upper chamber region 18 for protecting around the head and neck of the occupant and the lower chamber region 16 for protecting from the waist to the shoulders of the occupant, the airbag not only protects from the waist to the shoulders of the occupant, as with existing side airbags, nor protects only around the head of the occupant, as with curtain airbags, but can protect these both in a broad range. That is, the air bag 14 according to the present invention deploys in a semi-dome shape, covering an entire side portion of the occupant sitting in the seat, combining the functions of a side airbag and a curtain airbag.

Furthermore, since the airbag is disposed on one side portion of the seatback 2, the airbag device 14 can be mounted even without a seat having a special seat frame structure. That is, the airbag can be easily mounted to an existing vehicle seat without a significant design change or the like to the seat frame (2a).

As illustrated in FIG. 4, in the present embodiment, a periphery of a boundary between the upper chamber region 18 and the lower chamber region 16 of the airbag 14 is configured so as to be positioned between a seatbelt 100 and the occupant.

When the airbag 14 is positioned between the seatbelt 100 and the occupant in this manner, the airbag 14 deploys while in contact with the seatbelt 100 at a time inflation is initiated, and the airbag 14 captures a reaction force from the seatbelt 100. As a result, the deployment behavior and deployment orientation of the entire airbag 14 are stabilized. In particular, the upper chamber region 18 rises readily in the vertical direction (perpendicular direction) and can reliably restrain around the head of the occupant.

Furthermore, providing a connecting member (tab) 22 for joining the upper portion of the seat frame (2a) and the upper chamber region 18 of the airbag 14 enables stabilization of the airbag 14, particularly the deployment behavior and deployment orientation of the upper chamber region 18.

Further, as illustrated in FIG. 1(B) and FIG. 3, the upper chamber region 18 of the airbag 14 is disposed further outside than a width direction center (called "seatback center" herein below) L1 of the seatback 2.

By disposing the upper chamber region 18 against one side of the seatback 2 in this manner, the airbag device can be mounted without interfering with the headrest 4 even when the seatback 2 has an adjustable headrest 4.

Embodiment 2

Embodiment 2 of the present invention is described below, however structural elements common to or corresponding to embodiment 1 are given the same reference symbols and duplicate descriptions are omitted. Embodiment 2 is the configuration of embodiment 1 having a tether 30 added thereto.

Figure 5A:
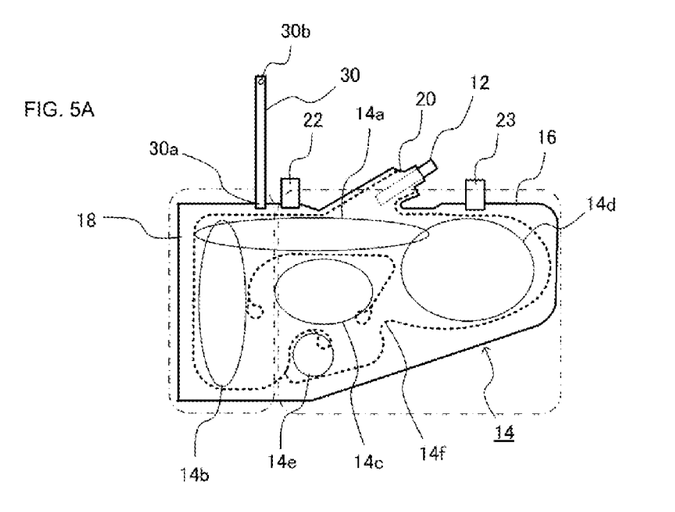
FIG. 5(A) is a plan view illustrating the state in which the airbag is deployed (state prior to compression, laid flat).
Figure 5B:
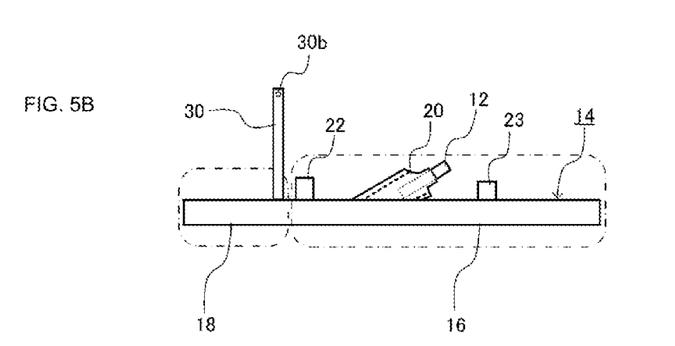
FIG. 5(B) is a front view illustrating the state in which the airbag is rolled (state when stowed).
Figure 6:
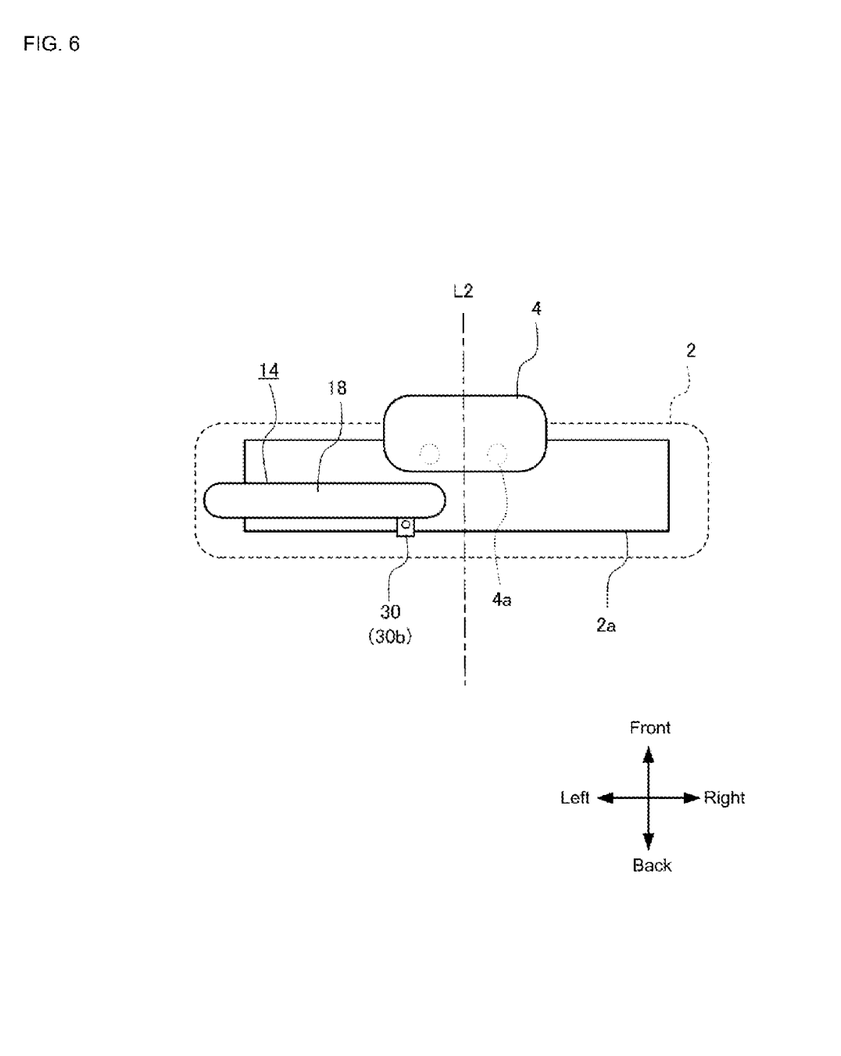
FIG. 6 is a top view illustrating an installed state of the airbag device according to embodiment 2 of the present invention.
Figure 7A:
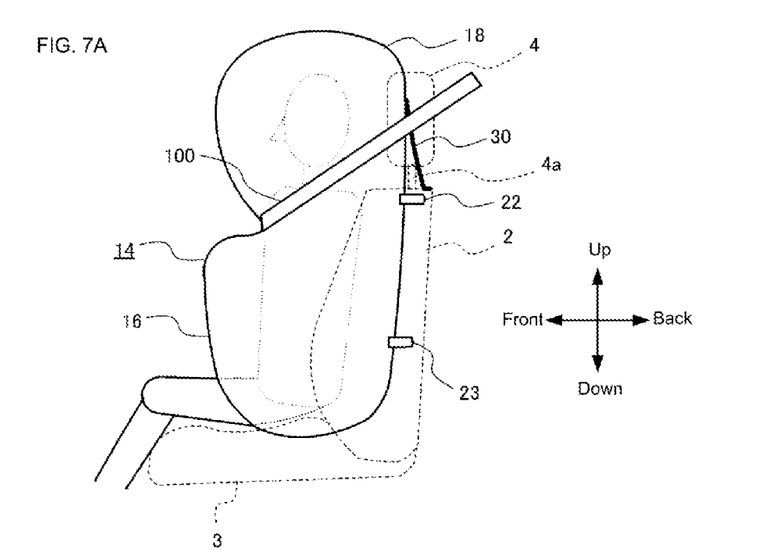
FIG. 7(A) illustrates this state viewed from the side in the vehicle width direction.
Figure 7B:
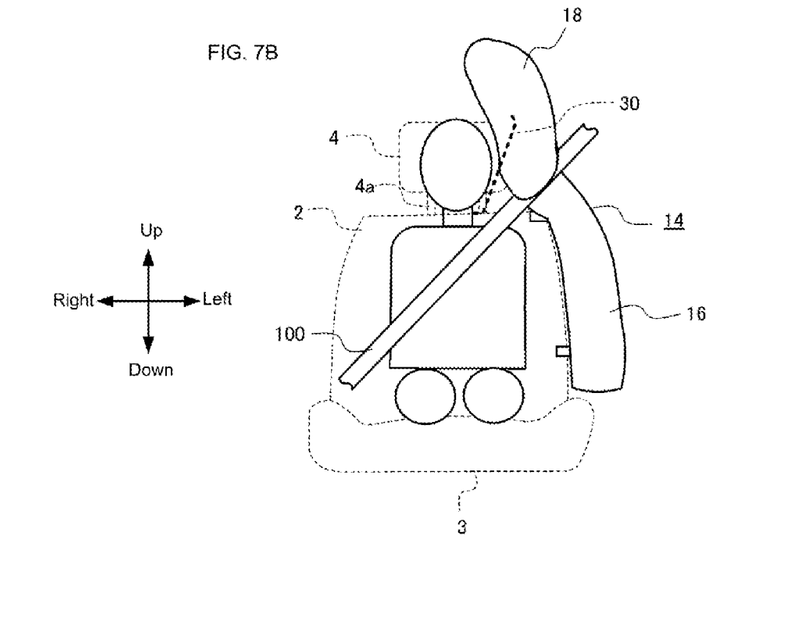
FIG. 7(B) illustrates this state viewed from the front.

FIG. 5 illustrates the structure of the airbag 14 according to embodiment 2 of the present invention. FIG. 5(A) is a plan view illustrating the state in which the airbag 14 is deployed (state prior to compression, laid flat). FIG. 5(B) is a front view illustrating the state in which the airbag is rolled (state when stowed). FIG. 6 is a top view illustrating an installed state of the airbag device according to embodiment 2 of the present invention. FIG. 7 illustrates the activated state (deployed state of the airbag 14) of the airbag device according to embodiment 2 of the present invention. FIG. 3(A) illustrates a state viewed from the side in the vehicle width direction, and FIG. 3(B) illustrates a state viewed from the front.

The tether 30 has a first securing part 30a joined to the upper chamber region 18 of the airbag 14 and a second securing part 30b joined to the seatback 2.

As illustrated in FIG. 6, the second securing part 30b is positioned further outside than a center L2 of the seatback 2.

Since the present embodiment is provided with the tether 30 for joining the airbag 14 and the seat frame (2a), as illustrated in FIG. 7, a prescribed tension is applied to the upper chamber region 18 of the airbag 14, which allows a deployment orientation of the upper chamber region 18 to be maintained in an appropriate state.

Moreover, by also disposing the tether 30 in addition to the upper chamber region 18 against one side (outside) of the seatback 2, the airbag device can be mounted without interfering with the headrest 4 even when the seatback 2 has an adjustable headrest 4.

(Stowed State of Airbag 14)

Other stowing aspects of the airbag 14 are described below with reference to FIG. 8(A), (B), FIG. 9, FIG. 10(A), (B), and FIG. 11(A), (B). Note that each drawing is schematically illustrated in a state in which the urethane layer or the like of the seat back 2 is removed for the purpose of clarifying the arrangement of the airbag 14.

Figure 8A:
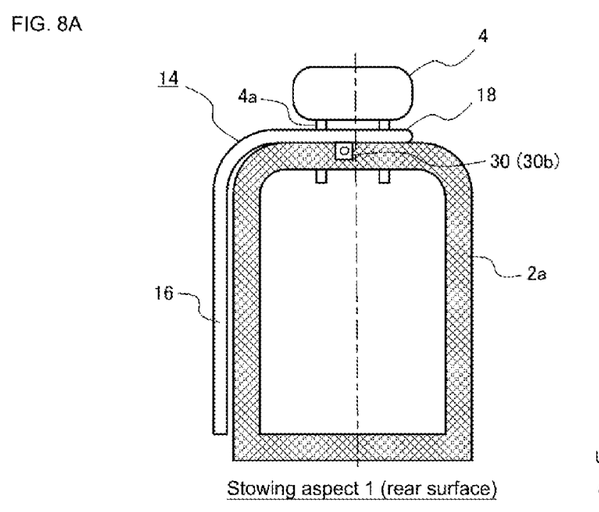
FIGS. 8(A) and (B) are rear views illustrating other stowed states (states 1 and 2) of an airbag applicable to embodiment 2 of the present invention, and are illustrated in a state in which a urethane layer of the seatback is removed.

In an aspect 1 illustrated in FIG. 8(A), the upper chamber region 18 of the airbag 14 is installed, in an extended state without folding, on an upper surface of the seat frame 2a, and the second securing part 30b (end part on seat frame 2a side) of the tether 30 is set on a rear surface of an upper portion of the seat frame 2a.

Figure 8B:
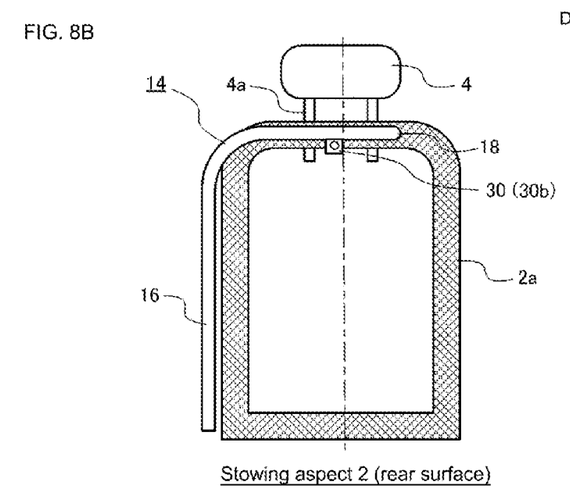

An aspect 2 illustrated in FIG. 8(B) is the same as (A) above until the upper chamber region 18 of the airbag 14 is installed in the extended state without folding, but the upper chamber region 18 is supported (stowed) on the rear surface of the seat frame 2a.

Figure 9:
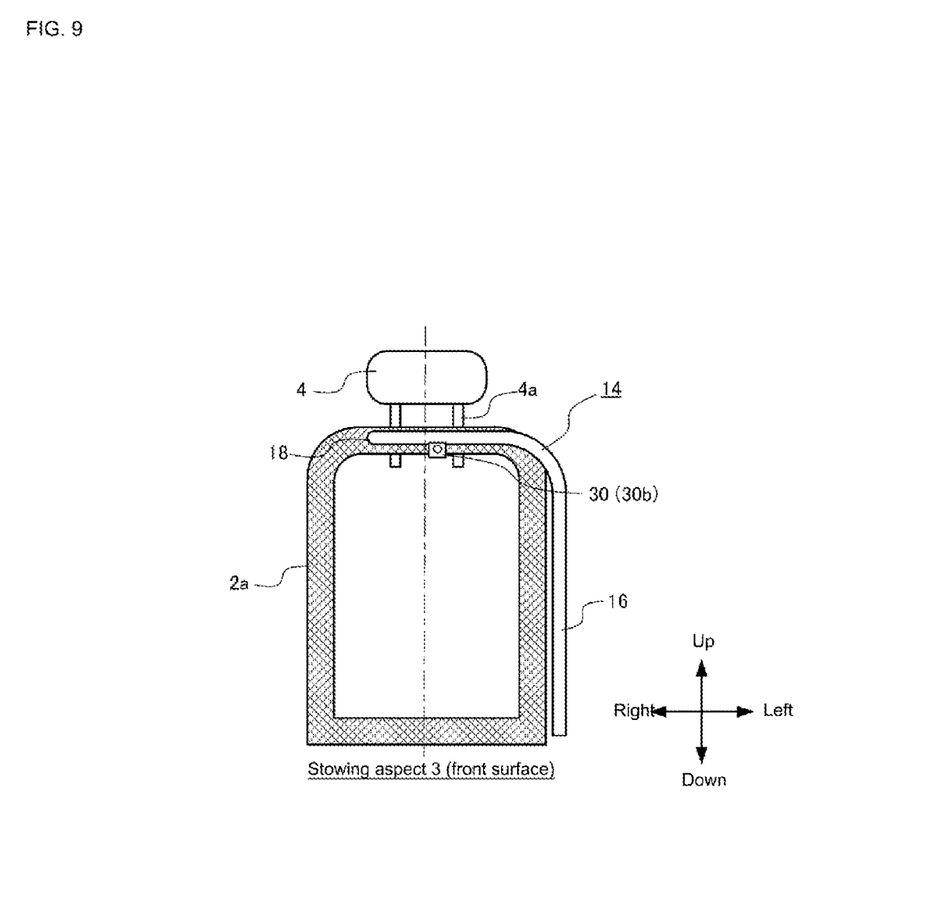
FIG. 9 is a front view illustrating another stowed state (state 3) of the airbag applicable to embodiment 2 of the present invention, and is illustrated in a state in which the urethane layer of the seatback is removed.

In an aspect 3 illustrated in FIG. 9, the upper chamber region 18 of the airbag 14 is disposed running on the front side of the seat frame 2a, which is the difference from the aspect in FIG. 8(B), being on the front surface rather than the rear surface.

Figure 10A:
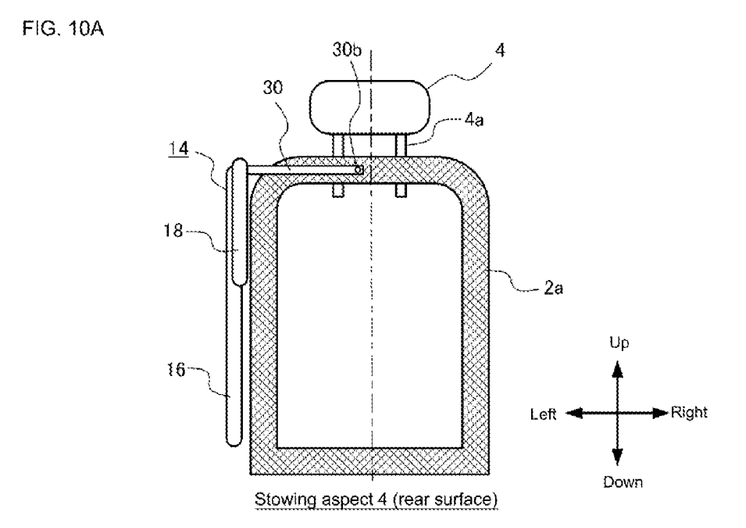
FIGS. 10(A) and (B) are rear and side views illustrating another stowed state (state 4) of the airbag applicable to embodiment 2 of the present invention, and are illustrated in a state in which the urethane layer of the seatback is removed.
Figure 10B:
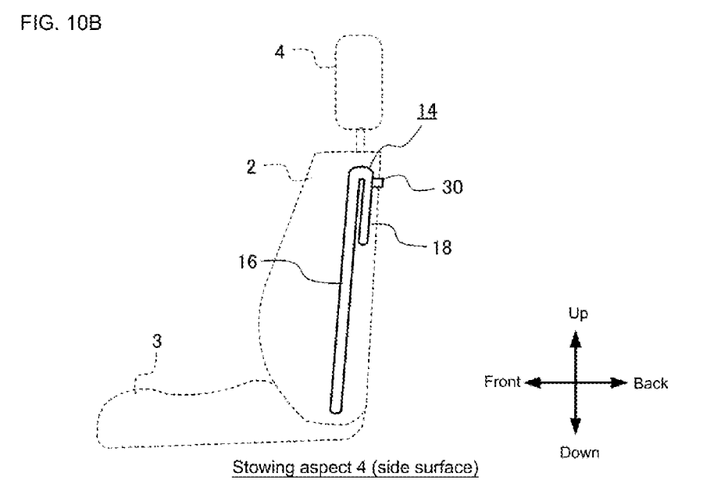

In an aspect 4 illustrated in FIGS. 10(A) and (B), the upper chamber region of the airbag 18 of the airbag 14 is bent downward and disposed along a side surface of the seat frame 2a, similarly to the lower chamber region 16. In this case, the tether 30 extends in the horizontal direction, and the second securing part 30b can be secured to a rear surface of the seat frame 2a. Note that the tether 30 can also be run on the front side of the seat frame 2a and secured. Note that in embodiment 4, as illustrated in FIG. (B), the upper chamber region 18 of the airbag 14 is stowed in a rearwardly folded state.

Figure 11A:
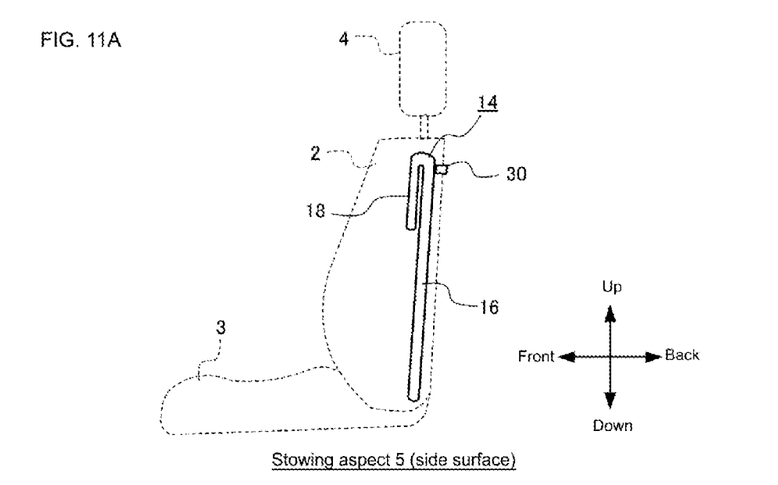
FIGS. 11(A) and (B) are side and rear views illustrating other stowed states (states 5 and 6) of the airbag applicable to embodiment 2 of the present invention, and are illustrated in a state in which the urethane layer of the seatback is removed.

In an aspect 5 illustrated in FIG. 11(A), the upper chamber region 18 of the airbag 14 differs from that in the aspect 4 illustrated in FIGS. 10(A) and (B) in that the airbag is stowed in a forwardly folded state.

Figure 11B:
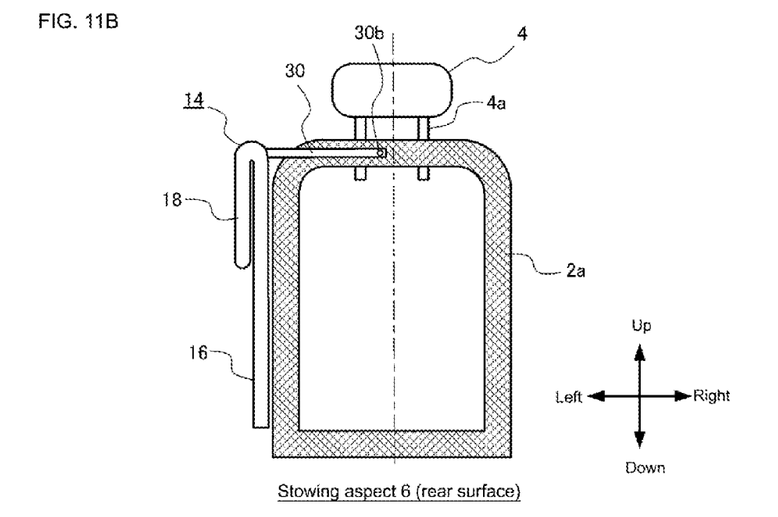

In an aspect 6 illustrated in FIG. 11(B), the upper chamber region 18 of the airbag 14 differs from that in the aspect 4 illustrated in FIG. 10(A) in that the airbag is stowed in a state folded outside of a seat side portion.

Figure 12:
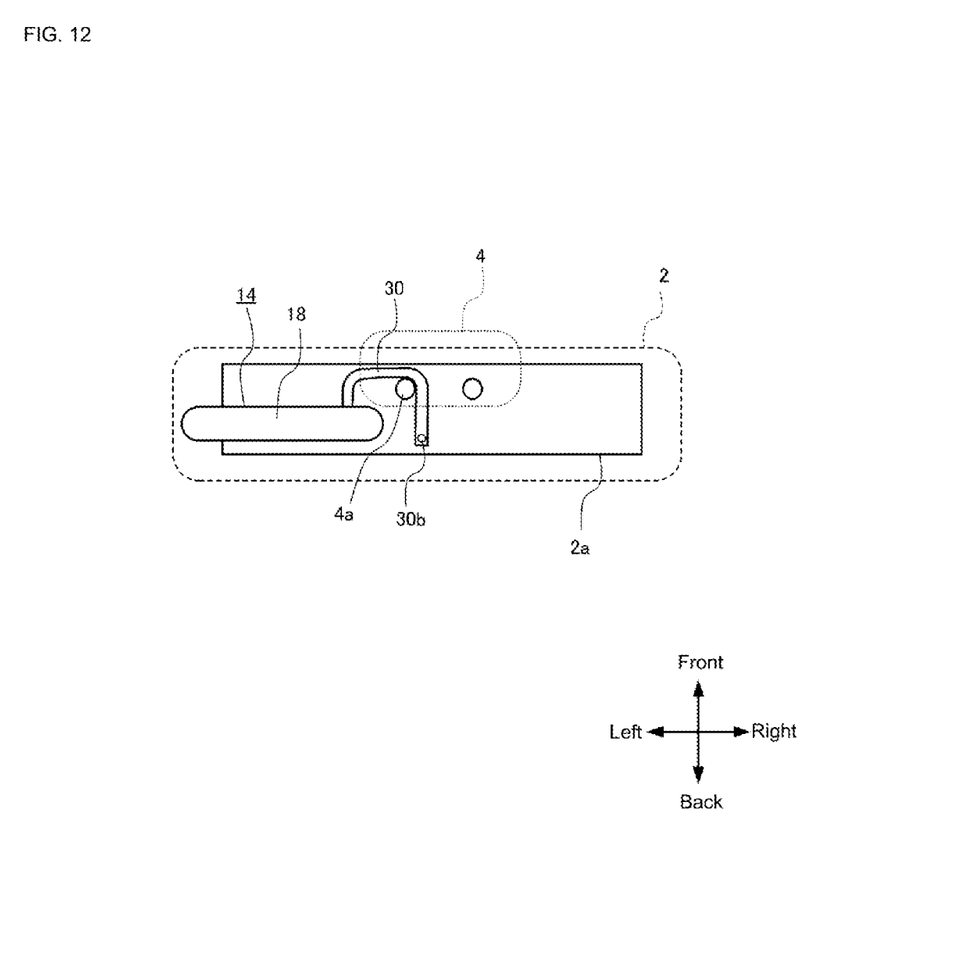
FIG. 12 is a top view illustrating an arrangement version of the airbag applicable to embodiment 2 of the present invention.

FIG. 12 is a top view illustrating another aspect of the arrangement of the airbag applicable to embodiment 2 of the present invention. In this example, one portion of the tether 30 extends in a state hooked on a headrest pole 4a in a U-shape. By wrapping (hooking) the tether 30 on the headrest pole 4a in this manner, a number of support points supporting the tether 30 increases by one in addition to the first and second securing parts 30a and 30b, making for reliable behavioral control of the airbag 14 by means of the tether 30.

Note that a center portion of the tether 30 can also be disposed hooked on both of two headrest poles 4a.

The present invention has been described with reference to embodiments; however, the present invention is not limited to the embodiments described above. In other words, changes can be made as necessary without deviating from the scope of the technical concept of the invention.

The invention claimed is:

1. An airbag device in combination with a seatbelt and a vehicle seat having a seat cushion forming a seat surface and a seatback forming a backrest, the airbag device comprising:
   an inflator stowed in one side portion of the seatback that generates an inflation gas; and
   an airbag stowed inside the seatback in a rolled or folded state that deploys from the one side portion in response to inflation gas released from the inflator, the airbag including an upper chamber region stowed horizontally along an upper portion of the seatback for protecting at least around a head and a neck of an occupant, a lower chamber region stowed vertically along the one side portion of the seatback for protecting mainly from a waist to shoulders of the occupant, and a non-expandable seatbelt holder portion between the upper chamber region and the lower chamber region, an inflator insertion port provided on a vehicle rear side in a central portion in a vertical direction, and a duct part for communicating with the inflator insertion port that extends in the vertical direction along an edge portion on the vehicle rear side from the upper chamber region across the lower chamber region, wherein the airbag includes a head/neck protecting chamber in the upper chamber region that extends from an upper portion of the airbag, a shoulder protecting chamber in the lower chamber region, separated from the duct part and the head/neck protecting chamber, a waist protecting chamber that extends from a lower portion of the airbag, and a shoulder front protecting chamber in the lower chamber region;

wherein the airbag deploys toward a front of the seatback,
wherein a portion of the airbag is configured to be positioned between the seatbelt and the occupant upon deployment of the airbag with the seatbelt positioned in the non-expandable seatbelt holder portion; wherein the upper chamber region of the airbag is connected to the seatback by a first connecting member located above the inflator and the lower chamber region of the airbag is connected to the seatback by a second connecting member located below the inflator; a tether including an elongated strap longer than the first connecting member, wherein the tether has a first securing part joined to the upper chamber region of the airbag and a second securing part joined to an upper portion of the seatback.

2. The airbag device according to claim 1, wherein a periphery of a boundary between the upper chamber region and the lower chamber region of the airbag is positioned between the seatbelt and the occupant.

3. The airbag device according to claim 1, wherein the upper chamber region of the airbag is disposed more on a side of the one side portion than a center in a width direction of the seatback.

4. The airbag device according to claim 1, wherein the upper chamber region of the airbag is stowed in the upper portion of the seatback in a folded state.

5. The airbag device according to claim 1, wherein the second securing part of the tether is joined near a rear surface of the seatback.

6. The airbag device according to claim 1, wherein the second securing part of the tether is joined near an upper surface of the seatback.

7. The airbag device according to claim 1, wherein the second securing part of the tether is joined near a front surface of the seatback.

8. The airbag device according to claim 1, wherein the airbag is provided with a tab for fixing the airbag to an upper portion of the one side portion of the seatback.

9. The airbag device according to claim 1, wherein the airbag device is disposed in the one side portion of the vehicle seat near a door.

10. The airbag device according to claim 1, wherein the non-expandable seatbelt holder portion defining a recess receiving the seatbelt.

11. The airbag device according to claim 10, wherein the recess is located between the shoulder front protecting chamber and the waist protecting chamber.

12. The airbag device according to claim 10, wherein the recess is located in a forward facing side of the airbag.

13. An airbag device installed in a vehicle seat having a seat cushion forming a seat surface and a seatback forming a backrest, the airbag device comprising:
  an inflator stowed in one side portion of the seatback that generates an inflation gas;
  an airbag stowed inside the seatback in a rolled or folded state that deploys from the one side portion by the inflation gas released from the inflator, the airbag deployable toward a front of the seatback and including an upper chamber region and a lower chamber region; and
  a tether having a first securing part joined to the upper chamber region of the airbag and a second securing part joined to the seatback,
  wherein the vehicle seat is provided with a headrest disposed on an upper portion of the seatback, the headrest joined to a headrest pole that extends perpendicular to an upper surface of the seatback, wherein one portion of the tether extends in a state hooked on the headrest pole in a U-shape.

* * * * *